United States Patent [19]
Murray

[11] Patent Number: 6,079,601
[45] Date of Patent: Jun. 27, 2000

[54] ANCHORAGE DEVICE

[75] Inventor: Frederick G. Murray, Southington, Conn.

[73] Assignee: Industri AB Thule, Hillerstorp, Sweden

[21] Appl. No.: 09/124,930

[22] Filed: Jul. 29, 1998

Related U.S. Application Data

[63] Continuation of application No. PCT/SE97/00236, Feb. 14, 1997.

[30] Foreign Application Priority Data

Feb. 29, 1996 [SE] Sweden .................................. 9600809

[51] Int. Cl.[7] ............................... B60R 9/052; B60R 9/04
[52] U.S. Cl. ........................... 224/319; 224/324; 224/322
[58] Field of Search ..................................... 224/324, 319, 224/322, 323, 309, 448; 248/74.1, 226.11, 316.1, 316.2, 316.3, 74.3, 228.2, 230.2, 231.31, 228.3, 230.3, 231.41, 228.6, 230.6, 231.81, 228.7, 230.7, 231.9

[56] References Cited

U.S. PATENT DOCUMENTS

| | | | |
|---|---|---|---|
| 4,736,878 | 4/1988 | Rasor | 224/321 |
| 5,490,621 | 2/1996 | Dixon et al. | 224/324 |
| 5,769,292 | 6/1998 | Cucheran et al. | 224/324 |
| 5,779,119 | 7/1998 | Talbot et al. | 224/324 |

FOREIGN PATENT DOCUMENTS

| | | |
|---|---|---|
| 0003195 | 1/1979 | European Pat. Off. . |
| 344862 | 12/1989 | European Pat. Off. .............. 248/74.1 |
| 2434055 | 3/1980 | France . |
| 2470029 | 5/1981 | France . |
| 2040962 | 5/1972 | Germany . |
| 3817470 | 1/1989 | Germany . |

*Primary Examiner*—Linda J. Sholl
*Attorney, Agent, or Firm*—Royston, Rayzor, Vickery, Novak & Druce, L.L.P.

[57] ABSTRACT

An anchorage device is intended for securing a load carrier on a load carrier strut which is disposed on a vehicle. The anchorage device includes an openable clamp (9) produced from a flexible material and a tensioning device (18). The tensioning device (18) extends through mutually overlapping end portions (10, 15) of the clamp (9). The clamp (9) is, in the open state, movable to a position surrounding the load carrier strut. On tightening of the tensioning device (18), the end portions (10, 15) are fixed against the load carrier. The one end portion (15) has a closed aperture through which the tensioning device (18) extends. The other end portion (10) has an open recess for accommodating the tensioning device (18). Each of the end portions have abuttable surfaces configured for abutting engagement.

13 Claims, 2 Drawing Sheets

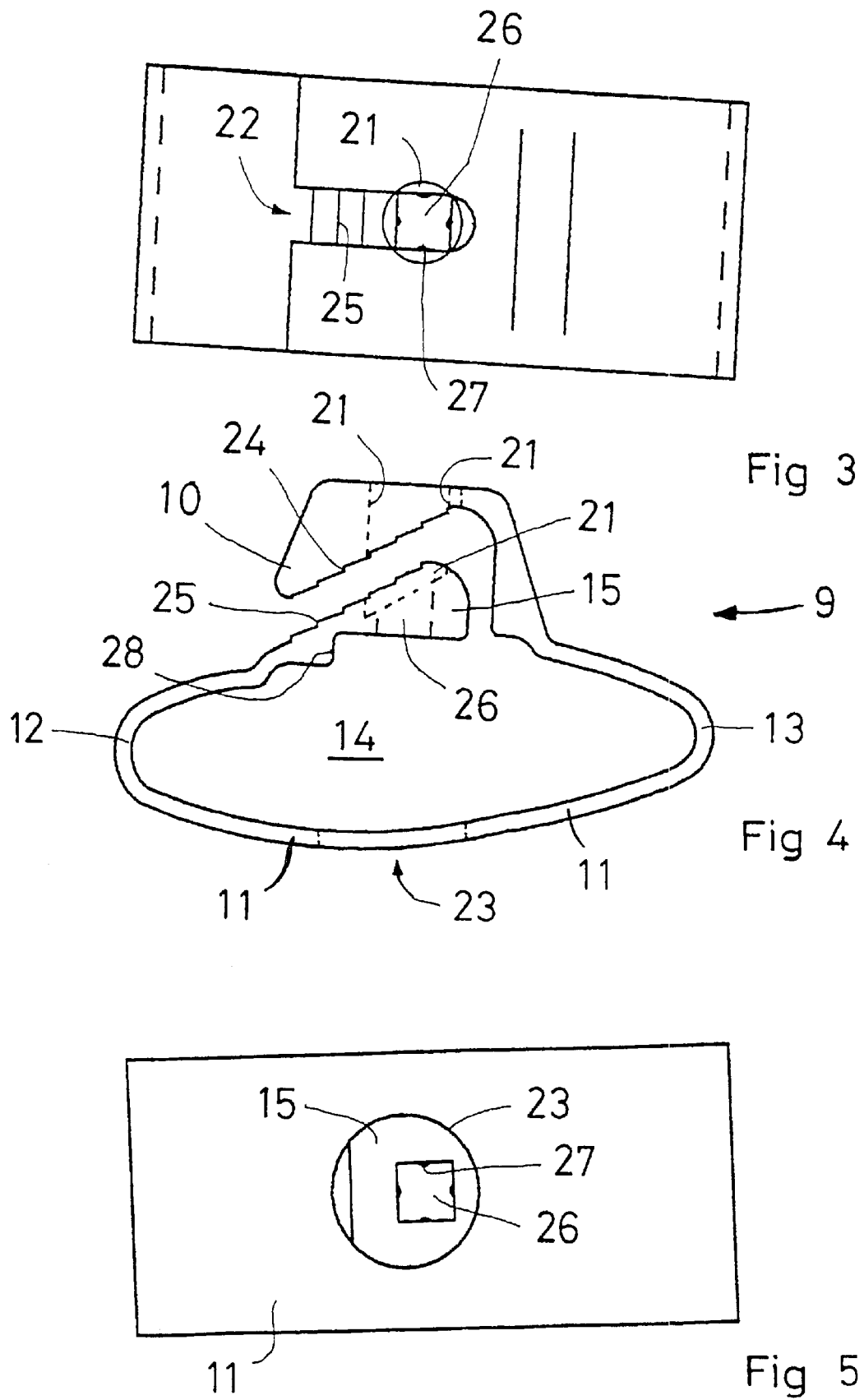

ANCHORAGE DEVICE

CROSS-REFERENCES TO RELATED APPLICATIONS

This is a continuation application claiming priority to International Application Number PCT/SE97/00236 filed Feb. 14, 1997 and to Swedish Application Number SE9600809-9 filed Feb. 29, 1996 to which the International Application also claims priority. The full disclosure of each of said applications is hereby expressly incorporated by reference into the present application.

TECHNICAL FIELD

The present invention relates to an anchorage device for securing an object such as a load carrier on a load carrier strut which is disposed on a vehicle, and which comprises an openable clamp produced from flexible material which, in the open state, may be moved to a position surrounding the load carrier strut, and a tensioning device which extends through mutually overlapping end portions of the clamp and, on tightening of the tensioning device, fixes the end portions against the load carrier.

BACKGROUND OF THE INVENTION

An anchorage device of the type described by way of introduction is previously known in the art. It includes a clamp which is produced from a resiliently yieldable plastic material and which has two mutually overlapping end portions which, when the clamp is in use, abut against or are accommodated in a recess in the load carrier. These end portions have through-going apertures through which a screw extends, the screw being secured with its head in the load carrier and with some type of nut interiorly in the clamp between the inside of the clamp and the load carrier strut.

A construction of the above-outlined type cannot be permanently fixed in place in the load carrier as an integral part thereof, since, with the screw mounted in place, it cannot be opened and moved over the load carrier strut. Thus, the prior art clamp must be handled as a loose part which runs the risk of getting lost.

Given that the two mutually overlapping end portions of the clamp have through-going apertures, no- or very poor-self locking effect will be achieved in the clamp when this is tightened against the load carrier, since both end portions cannot slide unhindered in relation to one another because of the screw. This implies that the clamp under consideration here must have extremely narrow tolerances in order to function together with a load carrier strut.

SUMMARY OF THE INVENTION

The present invention is designed as an anchorage device that obviates the drawbacks from which prior similar devices suffer. In particular, an object of the present invention is to provide an anchorage device which may be stored and handled as an integral part of the load carrier and which, hence, need not be separated from the load carrier either on mounting, dismounting or storage of the load carrier. Further, the present invention provides an anchorage device which gives improved retention around the load carrier strut if the tolerances on the strut or the clamp included in the anchorage device were to bar. Finally, the present invention has for its object to realize an anchorage device which is simple and economical to manufacture, which is easy to use and which affords an extremely reliable anchorage of the load carrier.

In at least one embodiment, the present invention is an anchorage device for securing an object such as a load carrier on a load carrier strut disposed on a vehicle. The anchorage device includes an openable clamp that may be configured between open and secured configurations. When in the open configuration, the clamp may be positioned about a load carrier strut. Typically, the clamp's engagement about the strut will be such that a portion of the strut is surrounded by the clamp. A tensioning device extends through mutually overlapping end portions of the clamp and is adapted to fix one of the end portions against the object such as a load carrier which is to be secured upon a vehicle while another of the end portions of the clamp is adapted to be fixed against or about the load carrier strut. One of the end portions has a closed aperture therethrough and in which the tensioning device extends. The other of the end portions has an open recess for accommodating projection therethrough of the tensioning device. Because of this configuration of the anchorage device, the two end portions are able to lay one on top of the other and because of the recess, relative sliding motion between the end portions is permitted during the tightening process of the tensioning device.

The objects forming the basis of the present invention will be attained if the anchorage device disclosed by way of introduction above is characterized in that the one end portion has a closed aperture through which the tensioning device extends, while the other end portion has an open recess for accommodating the tensioning device.

BRIEF DESCRIPTION OF THE DRAWINGS

The present invention will now be described in greater detail hereinbelow, with reference to the accompanying Drawings. In the accompanying Drawings:

FIG. 3 shows a modified embodiment of a clamp seen from above;

FIG. 4 shows the clamp according to FIG. 3 seen in the longitudinal direction of a load carrier strut; and FIG. 5 shows the clamp according to FIGS. 3 and 4 seen from beneath.

DESCRIPTION OF PREFERRED EMBODIMENT

Figure 1:
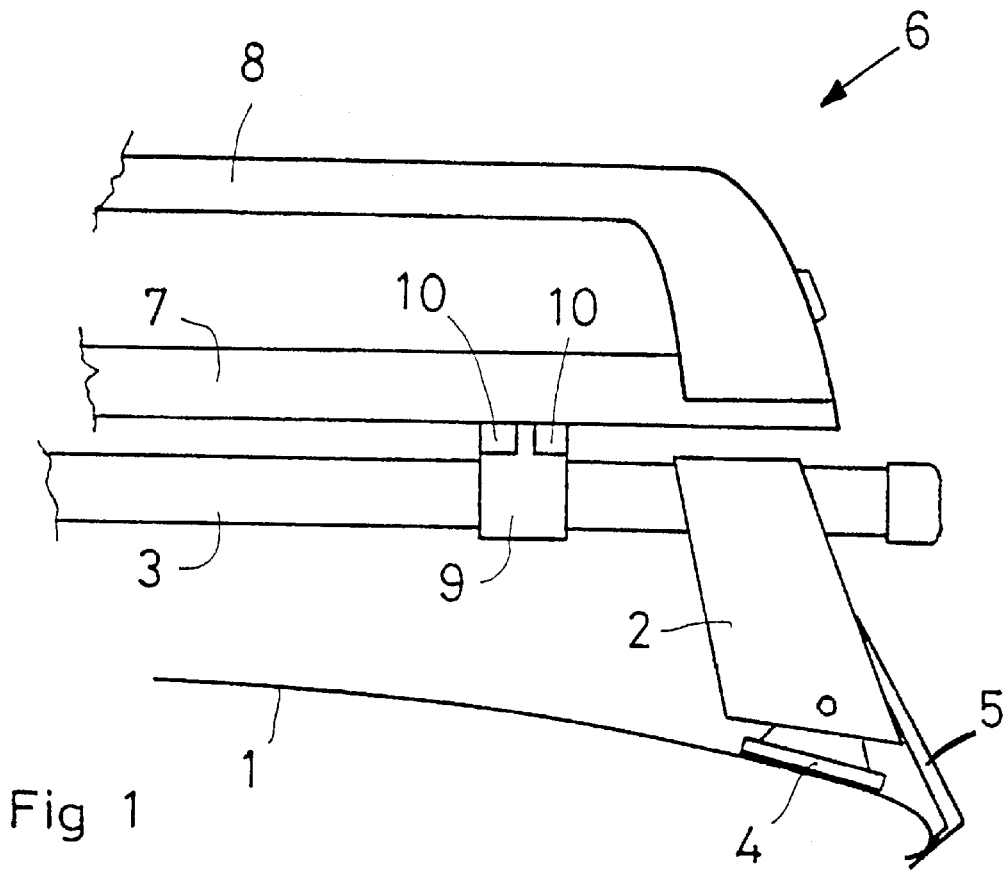
FIG. 1 shows, for purposes of exemplification, one end portion of a load carrier which is secured on a vehicle roof and which is designed as a ski bracket.

In FIG. 1, reference numeral 1 relates to a roof contour or the upper defining surface of a vehicle roof, reference numeral 2 relates to a foot device which is applied at the side edge area of the vehicle roof 1 and which is intended for fixedly clamping of a load carrier strut 3 transversely over the vehicle roof and transversely of the direction of travel of the vehicle. If it is assumed that the vehicle 1 in FIG. 1 is seen from the rear, this implies that the Figure only shows the right-hand end portion of the load carrier strut 3 and the right-side foot device. A corresponding foot device is placed at the opposite, left edge portion of the vehicle roof (not shown in the Figure), and the load carrier strut 3 extends between both of these two foot devices.

Each one of the foot devices 2 includes means for fixedly securing on the load strut 3 so that the foot device and the load carrier strut, in the mounted state, form a rigid unit. The foot devices further have a support portion 4 which, preferably with a resiliently yieldable or elastic lower layer, rest on the vehicle roof 1. The foot device 2 further has a clamping catch 5 by means of which the foot device and the load carrier strut 3 interconnected therewith may be clamped fast on the vehicle. The load carrier strut 3 and the cooperating foot devices 2 may be considered as conventional in this context and are not germane parts of the present invention.

Even though the present invention will, for purposes of exemplification, be illustrated together with a load carrier strut which is removably fixed so that it extends transversely over the vehicle roof and transversely of the longitudinal direction of the vehicle, the present invention may also be applicable in fully analogous form to lengthwise or longitudinally permanently mounted load carriers or railings which extend substantially parallel to the direction of travel of the vehicle.

In FIG. 1, a load carrier 6 is secured on the load carrier strut 3 and is, for purposes of exemplification, illustrated as a ski bracket. Naturally, the present invention may just as readily be applied to other types of load carriers, such as brackets for wind surfing boards, canoes, bicycles, load boxes etc.

The ski bracket 6 illustrated in FIG. 1 includes a lower rail 7 and an upper rail 8. The skis (not shown in the Figure) are intended to be located between these rails and be fixedly clamped with the aid of suitable elastic means, for example of rubber. The lower rail 7 also serves for fixedly securing the ski bracket 6 on the load carrier strut 3 with the aid of a clamp 9 schematically illustrated in FIG. 1. A further such clamp is provided at the left-hand end of the ski bracket though not shown in the Figure.

The clamp is made of yieldable but preferably resilient plastic material and is open so that, in the open state, it may be passed over the load carrier strut 3 such that the load carrier strut 3 is enclosed in the clamp 9. This is achieved in that the upper end portion 10 of the clamp 9 is released from the rest of the clamp 9 and is bent free so that the load carrier strut 3 may be passed in interiorly in the clamp 9. While this is taking place, the clamp 9 is fixedly secured in the load carrier 6 with the aid of a tensioning device (not shown in FIG. 1) preferably as screw 18 (see FIG. 2).

Figure 2:
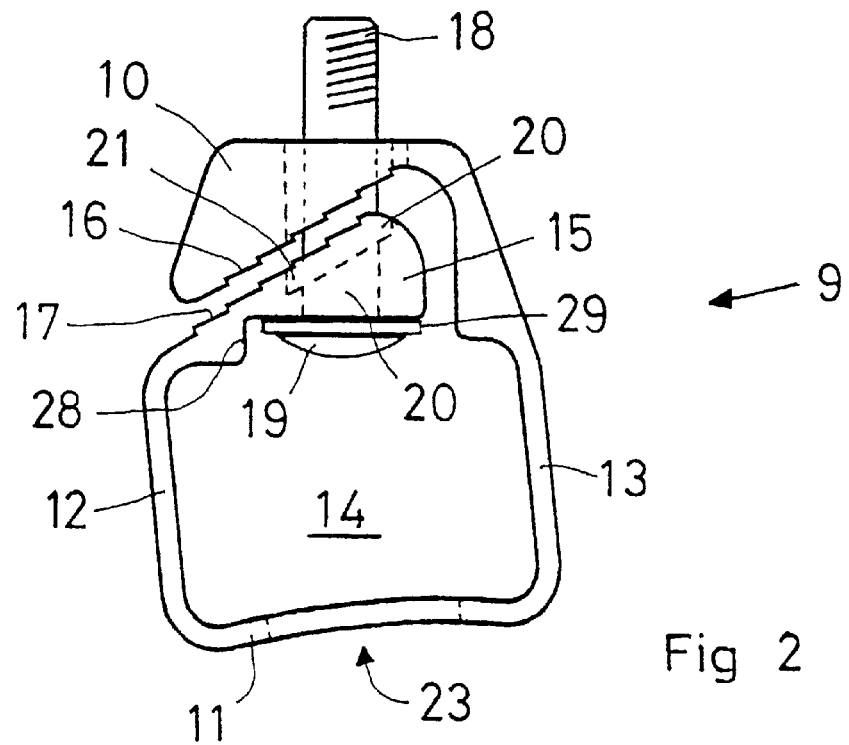
FIG. 2 shows a clamp included in the device according to FIG. 1 seen in the longitudinal direction of the load carrier strut which is included in the arrangement of FIG. 1.

FIG. 2 shows, in the longitudinal direction of the load carrier strut 3, the clamp 9 which, in FIG. 1, is employed for interconnecting the load carrier or ski bracket 6 and the load carrier strut 3.

It will be apparent from FIG. 2 that the clamp 9 has a lower wall 11 from which both side walls 12 and 13 extend upwardly. The walls 11, 12, and 13 define, together with the upper portion of the clamp, an inner space 14 in the clamp which, in the tightened position of the clamp about the load carrier strut 3, is approximately complementary to the outer configuration of the load carrier strut 3.

The one side wall 12 has, at its upper end, an approximately horizontally directed cuneiform end portion 15 which increases in thickness from the side wall 12 in a direction towards the opposite side wall 13. The term increased thickness is here taken to signify that the vertical extent of the end portion 15 increases.

Correspondingly, the other side wall 13 has, in its upper end, a cuneiform end portion 10 which is located above the end portion 15. The upper end portion 10 is cuneiform such that its thickness increases in a direction from the side wall 13 towards the opposite side wall 12. Hereby, both of the end portions 10 and 15 will have contact surfaces 16 and 17 which are obliquely directed in relation to the longitudinal direction of the tensioning device 18, preferably designed as a screw, which extends through both of the end portions 10 and 15 respectively. The oblique inclination of the contact surfaces is such that, on tightening of the screw, i.e. when the contact surfaces 16 and 17 are compressed towards one another, the cuneiform end portions strive to slide in relation to one another in the transverse direction of the screw 18 so that the clamp is thereby closed and the spacing between both of the side walls 12 and 13 will be reduced.

The two contact surfaces 16 and 17 are grooved or provided with barbed mutually engageable projections 24 and 25, respectively (see FIG. 4) which are directed such that they permit a closure of the clamp, i.e. a displacement of the end portions 10 and 15 in relation to one another in that direction in which the side walls 12 and 13 are brought closer to one another. On the other hand, the projections are designed so as to prevent movement in the opposite direction between the end portions 10 and 15 when the contact surfaces 16 and 17 touch one another.

In the proximity of its head 19, the screw 18 has a shaft portion 20 of non-circular cross section, which may suitably be rectangular or square. The lower end portion 15 has a correspondingly shaped aperture through which the screw 18 extends. Hereby, the screw 18 is in non-rotational connection with the lower end portion 15. Between the head 19 of the screw and the lower surface of the lower end portion 15, there is provided a metal washer 29 which has a non-circular, preferably rectangular aperture through which the shaft of the screw extends. The screw and the washer are hereby non-rotationally interconnected with one another. If the aperture 26 in the lower end portion 15 were to be damaged, the washer 29 will come into abutment against a transverse surface 28 on the underside of the end portion 15. This feature affords increased security against unintentional rotation of the screw 18.

The aperture in the lower end portion 15 through which the screw 18 extends has a flared portion 21 for accommodating a locking device which is designed so as to prevent or at least impede axial displacement of the screw 18 in relation to the aperture in the lower end portion. This locking device may, for example, be in the form of a rubber ring which is pressed down into the flared portion 21 and which thereby clamps about the shaft of the screw.

While it is not apparent from FIG. 2, the upper end portion 10 has an open recess for accommodating the screw 18. This recess is wholly analogous with that illustrated in FIG. 3 at reference numeral 22. The recess 22 discharges at the free end of the upper end portion.

While not being apparent from FIG. 2, the walls defining the space 14 in the clamp may be provided with ribs, projections or the like which extend into the space 14 in order thereby to realize good tensioning of the clamp about the load carrier strut even if the tolerance differences were to be great.

In order to make possible insertion of the screw 18 to the position illustrated in FIG. 2, the lower wall of the clamp 9 has a through-going aperture 23 which is sufficiently large to allow passage of the head 19 of the screw. The presence of the aperture 23 implies a weakening of the lower wall 11 of the clamp 9. In order to compensate for this loss, the lower wall 11 has, on its outside, reinforcement beads which are transversely directed in relation to the longitudinal direction of the load carrier strut 3 and which at least have the same longitudinal extent as the diameter or transverse dimension of the aperture 23. The reinforcement beads may possibly be replaced by or supplemented with increased material thickness in the lower wall 11 at least in the regions in register with the aperture 23.

FIG. 4 shows, in a view corresponding to that of FIG. 2, a modified embodiment of the clamp. This clamp is designed to surround a load carrier strut with an approximately elliptical, streamlined or aerofoil cross-section. Those details which are identical in FIGS. 4 and 2 have been given the same reference numerals in both figures.

It will be apparent from FIG. 4 that the two contact surfaces 16 and 17 on the end portions 10 and 15 have transverse groove systems 24 and 25, respectively as described above. It will further be apparent that the aperture 26 through the lower end portion 15 has a square cross-sectional configuration and that axially directed ribs 27 (see FIGS. 3 and 5) are provided on the defining surfaces of the aperture for the purpose of imparting to the screw 18 better grip in the lower end portion 15.

It will further be apparent from FIGS. 3 and 4 taken together that the flared portion 21 in the aperture is circular and that a corresponding flared portion 21 is also provided in the upper end portion 10.

FIG. 5 shows through the aperture 23 of the bottom wall 11 the aperture 26 with its ribs 27 in the lower end portion 15.

On mounting of a load carrier 6 according to the invention, the clamps 9 are secured in the lower rail 7 of the load carrier in that the screws 18 extend up into the rail and are provided with nuts, threaded wheels or the like. The nuts are backed off so far that the clamp 9 may be moved sufficiently far down from the lower rail 7 and the lower end portion 15. Thereafter, the clamp is bent to the open state so that it may be passed around the load carrier strut 3, whereafter the upper end portion 10 is once again moved transversely of the screw 18 in between the underside of the rail 7 and the lower end portion 15. In such instance, the screw will come to a position accommodated in the recess 22. When the nut is subsequently tightened on the screw 18, first both end portions 10 and 15 will be displaced towards one another approximately in the longitudinal direction of the screw 18. When both contact surfaces 16 and 17 touch one another, the end portions 10 and 15 will instead be displaced relative to one another transversely of the longitudinal direction of the screw so that the clamp is thereby closed hard and brought to a position where it reliably surrounds and fixedly clamps the load carrier strut 3. On dismounting of the load carrier 6, the procedural sequence is the reverse.

It should be appreciated that the present invention may be modified further without departing from the spirit and scope of the appended claims and equivalents thereto.

What is claimed and desired to be secured by Letters Patent is as follows:

1. An anchorage device for securing an object disposed on a vehicle, said anchorage device comprising:
  an openable clamp configurable between open and secured configurations, said clamp being positionable about a load carrier strut when in the open configuration;
  a tensioning device extending through mutually overlapping end portions of said clamp, said tensioning device adapted to fix one of said end portions against a load carrier strut;
  one of said end portions having a closed aperture through which the tensioning device extends and said other of said end portions having an open recess for accommodating said tensioning device therethrough and each of said end portions having abuttable surfaces configured for abutting engagement one to the other responsively to tensioning of said tensioning device; and
  each of said abuttable surfaces being grooved for interlocking engagement therebetween.

2. The anchorage device as recited in claim 1; wherein said recess is adapted to accommodate relative motion of said end portions relative to one to another during tightening of said tensioning device.

3. The anchorage device as recited in claim 1; wherein said recess is in said end portion adapted to be fixed against the load carrier.

4. The anchorage device as recited in claim 1; wherein said recess is open toward a free end of said end portion in which said recess is located.

5. The anchorage device as recited in claim 1; wherein said closed aperture further comprises a flared portion for accommodating a locking element, said locking element adapted for restricting axial displacement of said tensioining device in said aperture.

6. The anchorage device as recited in claim 1; wherein said closed aperture further comprises an expanded portion for accommodating a locking element, said locking element adapted for restricting axial displacement of said tensioning device in said aperture.

7. The anchorage device as recited in claim 1; wherein said closed aperture further comprises an expanded portion for accommodating a locking element, said locking element adapted for engaging said tensioning device and maintaining said tensioning device within said aperture.

8. The anchorage device as recited in claim 1; wherein said clamp further comprises an interior surface having grooves directed inwardly for engagement with an exterior portion of a load carrier strut.

9. The anchorage device as recited in claim 1; wherein said clamp further comprises an interior portion configured for complimentary engagement on an exterior portion of a load carrier strut.

10. An anchorage device for securing an object disposed on a vehicle, said anchorage device comprising:
  an openable clamp configurable between open and secured configurations, said clamp being positionable about a load carrier strut when in the open configuration;
  a tensioning device extending through mutually overlapping end portions of said clamp, said tensioning device adapted to fix one of said end portions against a load carrier strut;
  one of said end portions having a closed aperture through which the tensioning device extends and said other of said end portions having an open recess for accommodating said tensioning device therethrough and each of said end portions having abuttable surfaces configured for abutting engagement one to the other responsively to tensioning of said tensioning device; and
  at least one of said abuttable surfaces having at least one groove thereupon and said groove being barb-shaped and oriented to permit drawing together of said clamp and to resist opening of said clamp.

11. An anchorage device for securing an object disposed on a vehicle, said anchorage device comprising:
  an openable clamp configurable between open and secured configurations, said clamp being positionable about a load carrier strut when in the open configuration;
  a tensioning device extending through mutually overlapping end portions of said clamp, said tensioning device adapted to fix one of said end portions against a load carrier strut;

one of said end portions having a closed aperture through which the tensioning device extends and said other of said end portions having an open recess for accommodating said tensioning device therethrough and each of said end portions having abuttable surfaces configured for abutting engagement one to the other responsively to tensioning of said tensioning device; and each of said abuttable surfaces being oppositely terraced for interlocking engagement.

12. An anchorage device for securing an object on a vehicle, said anchorage device comprising:

an clamp configurable between an open configuration and a secured configuration, said clamp being positionable about a load carrier strut when in said open configuration;

said clamp having end portions configured to overlap one another in the secured configuration of said clamp, each of said end portions having confronting engageable surfaces adapted to facilitate surface-to-surface sliding relative motion therebetween during reconfiguration from said open configuration to said secured configuration; and each of said confronting engageable surfaces adapted to resist surface-to-surface sliding relative motion when in said secured configuration; and at least one of said confronting engageable surfaces having at least one barb-shaped groove thereupon, said at least one barb-shaped groove being configured to assist the resistance of surface-to-surface sliding motion of said confronting engageable surfaces when in said secured configuration.

13. The anchorage device as recited in claim 12; further comprising:

each of said confronting engageable surfaces having at least one barb-shaped groove thereupon, each of said grooves being configured for mutual hooked engagement one upon the other for assisting the resistance of surface-to-surface sliding motion of said confronting engageable surfaces when said clamp is in said secured configuration.

* * * * *